Figure 1:
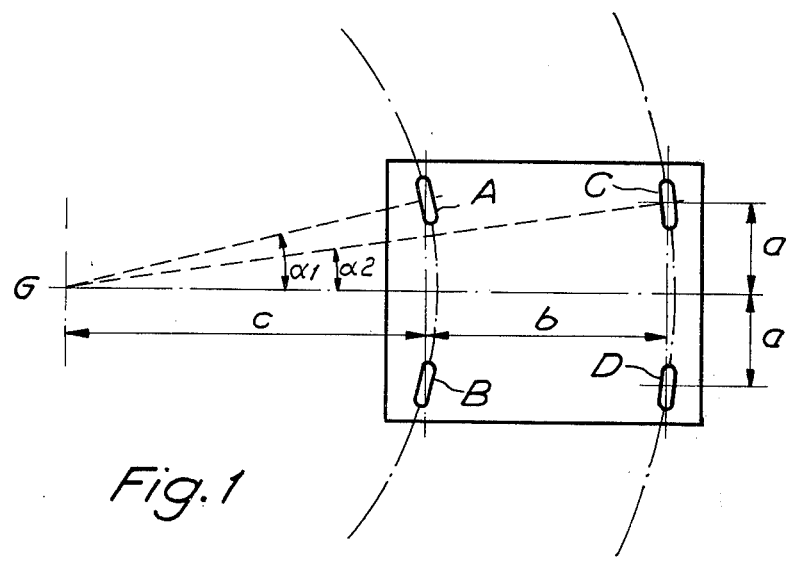

United States Patent [19]

Oler et al.

[11] 3,933,218

[45] Jan. 20, 1976

[54] CONTAINER HANDLING TRUCK

[75] Inventors: Ernst Bertil Oler; Odd Peder Hunnes, both of Karlskoga, Sweden

[73] Assignee: AB Bofors, Bofors, Sweden

[22] Filed: Oct. 7, 1974

[21] Appl. No.: 512,565

[30] Foreign Application Priority Data
Oct. 11, 1973 Sweden............................ 7313797

[52] U.S. Cl............ 180/79.1; 180/79.2 C; 214/390; 280/34 R
[51] Int. Cl.²... B60P 1/64; B62D 5/04; B62D 33/08
[58] Field of Search.......... 180/79.1, 79.2 C, 22, 23, 180/24; 214/390, 392, 394; 280/34 R; 296/26

[56] References Cited
UNITED STATES PATENTS

| | | | |
|---|---|---|---|
| 2,773,614 | 12/1956 | Edwards et al. | 214/390 |
| 2,888,088 | 5/1959 | Claas et al. | 296/26 X |
| 3,348,711 | 10/1967 | Gove | 214/392 |
| 3,572,458 | 3/1971 | Tax | 180/79.1 |
| 3,669,290 | 6/1972 | Doyle | 214/392 |

FOREIGN PATENTS OR APPLICATIONS

| | | | |
|---|---|---|---|
| 200,445 | 9/1968 | U.S.S.R. | 214/392 |

Primary Examiner—Leo Friaglia
Assistant Examiner—John A. Pekar
Attorney, Agent, or Firm—Elliott I. Pollock

[57] ABSTRACT

A truck adapted to stow, stack, etc., large containers comprises a chassis including a pair of substantially parallel cross beams extending in spaced relation to one another from a pair of elongated longitudinal beams which cooperate with the cross beams to provide a chassis of substantially C-configuration in horizontal cross section. The longitudinal beams are of telescopic construction with the parts thereof being selectively displaceable to vary the effective length of the longitudinal beams thereby to vary the spacing between the cross beams. The cross beams in turn are associated with vertically oriented telescopic support legs having support wheels at their lower ends which may be selectively displaced for steering purposes by means of associated electric servos. The servos are controlled by an electric steering system which includes a damping network comprising either a plurality of selectively switchable resistors, or a plurality of selectively variable potentiometers, which are in turn controlled by sensors carried by the telescopic parts of the longitudinal beam to switch over the steering system for adaptation to the steering geometry of the selected effective length of the longitudinal beams.

8 Claims, 15 Drawing Figures

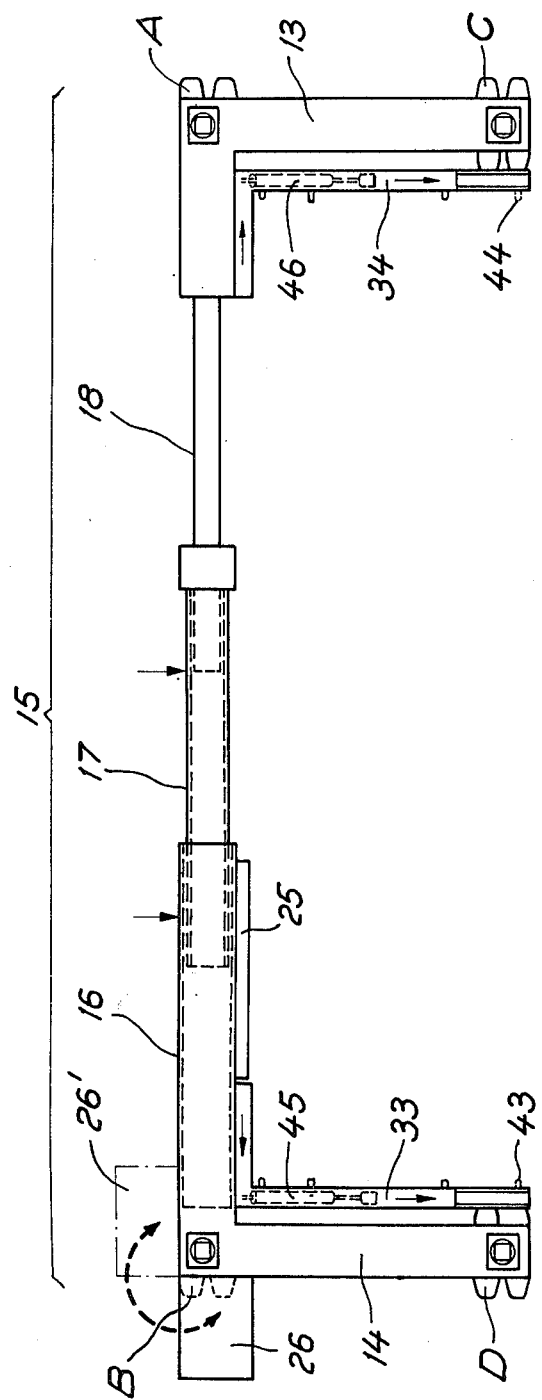

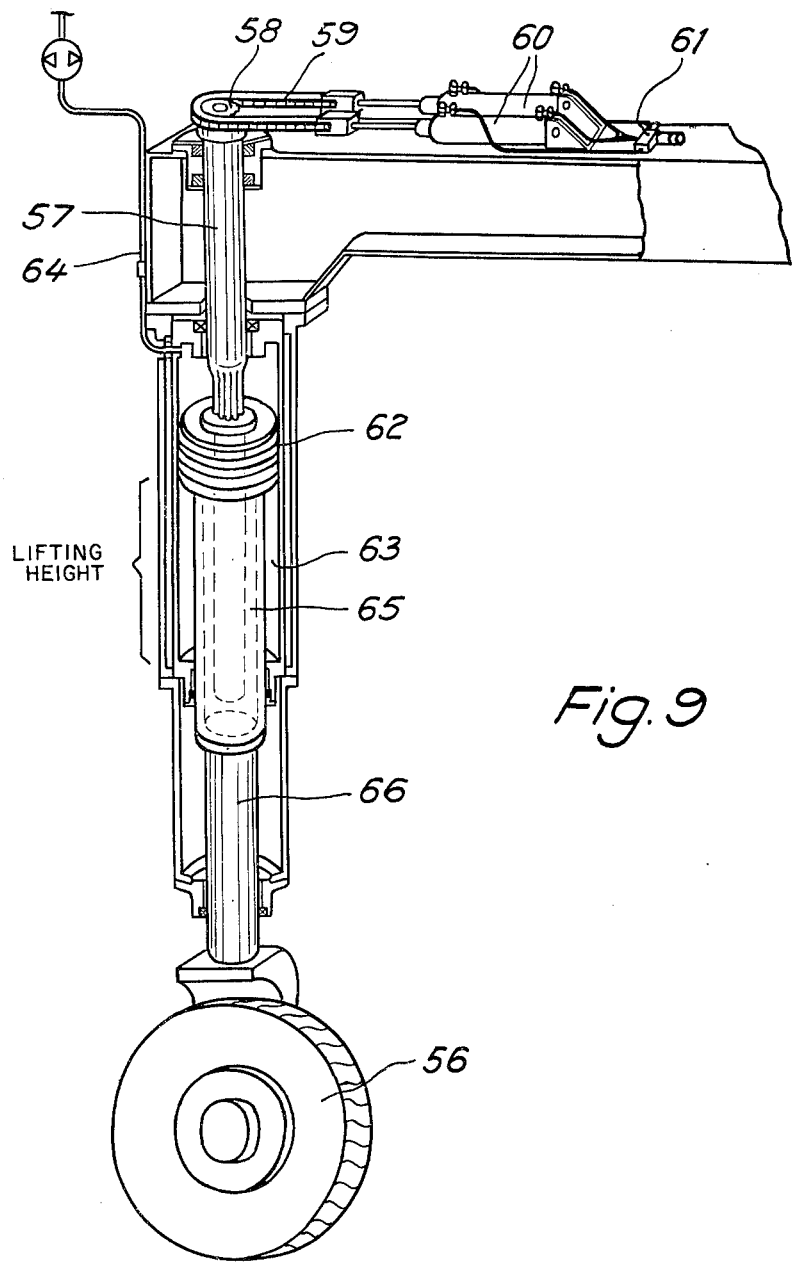

CONTAINER HANDLING TRUCK

The present invention relates to a truck, particularly intended for stowing, stacking, etc. of large containers of varying sizes, and which has a chassis frame supported at its corners by wheels, all of which can be steered by means of a steering system associated with the truck.

For trucks of this kind, there is, inter alia, a desire to be able to transport and to the greatest possible effective extent stow containers in ships of the so-called Ro-Ro-type and on wharfs, using one and the same implement. There is also a desire to be able to stack the containers using said implement.

The present invention is primarily intended to solve the abovementioned problems, and the feature that can mainly be considered to be characteristic of a truck according to the invention is that its chassis frame, in order that a variable length of same may be obtained, is composed of at least two frame members that can be displaced in relation to its other, that devices are arranged at the frame for sensing and/or indicating the prevailing length of the frame, and that the steering system is made so that it can be switched over for adaptation to the steering geometry for the sensed or indicated length of the frame.

According to further developments of the concept of the invention, the new truck is made with open portals in all directions which, together with the fact that all wheels can be steered, permits it to take a container standing on the ground or on a deck from any side whatsoever.

In a further embodiment the wheels are fastened to the frame via telescopic legs, whereby the truck frame can be lowered to levels with the upper edges of the containers, making it possible to run through low gates and to run on decks with a low deck height.

Figure 2:
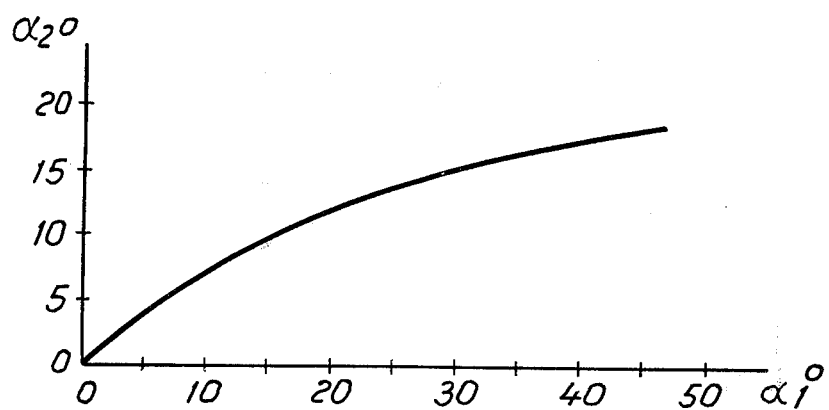
Figure 3A:
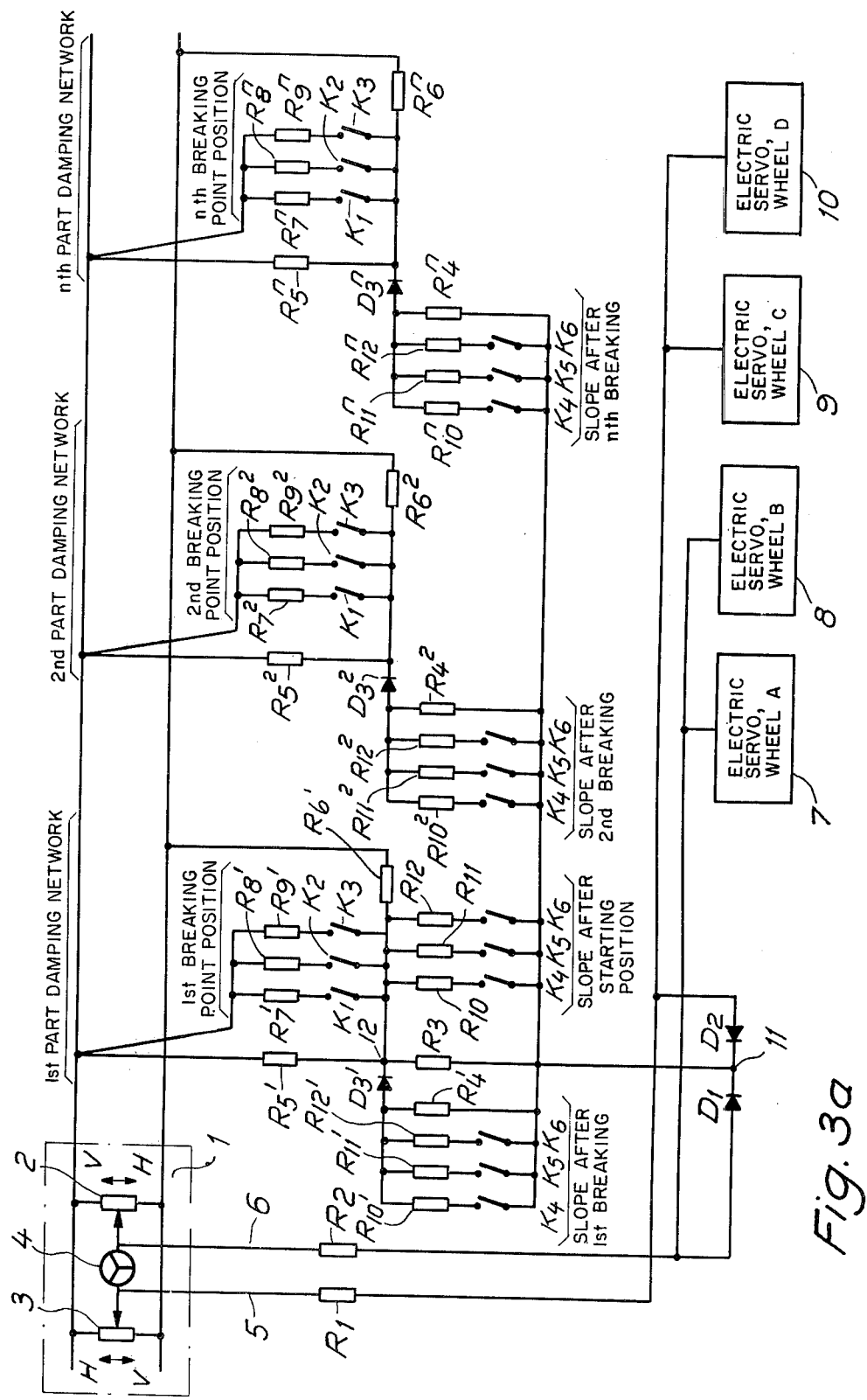
Figure 3B:
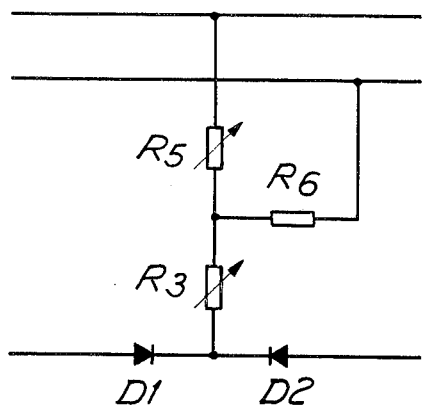
Figure 4:
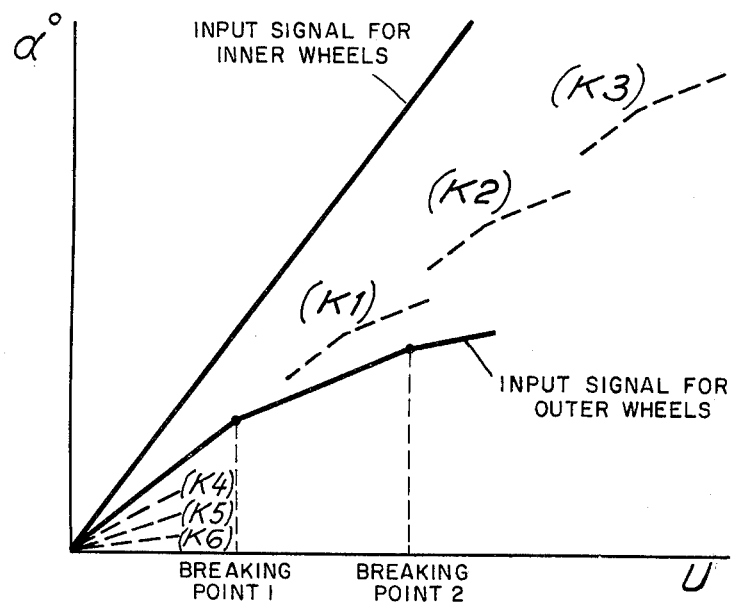

An embodiment proposed at present of a truck having the characteristics significant for the invention will be described in the following, with reference to the attached drawing, in which FIG. 1 shows, in principle, the sterring angle deflections and turning center of the type of truck in question FIG. 2 is a diagram showing the relation between the steering angles for the inner and outer pairs of wheels of the truck according to FIG. 1, FIGS. 3a–3b show in a schematic form alternative damping networks belonging to the steering system which utilize fixed and variable resistors, respectively, FIG. 4 is a diagram of the steering signals to the inner and outer pairs of wheels in the damping network according to FIG. 3a, FIGS. 5a–5d in various views show the design according to which the truck has been built up, FIGS. 6a–6b in vertical views show the frame members used in the trucks according to FIGS. 5a–5d, FIGS. 7a–7b in vertical views show an example of the design used for building up the microswitches comprised in the damping network according to FIG. 3a and their positioning in the frame members according to FIGS. 6a–6b, FIG. 8 in a vertical view shows an example of the design used for building up the variable resistors used in the damping network according to FIG. 3b, and FIG. 9 in perspective shows a representative telescopic leg for the truck.

The present invention can be utilized to advantage for a truck that has a steering system in which the four wheels can be set to be steered in two main directions for the truck at right angles in relation to each other. The actual switching of the steering system for adaptation of the steering geometry in the respective main steering direction, is previously known in itself, and will not be described here, and the truck according to the invention will be described only in conjunction with the steering of the wheels in one main direction, and the equipment needs then, in principle, only be duplicated and adapted to the other main direction.

FIG. 1 shows a vehicle with four-wheel steering, the wheels being designated A, B, C and D, of which the wheels A and B in the case shown are an inner pair of wheels and the wheels C and D are an outer pair of wheels. The wheels have been giving a common turning center G, which involves that the inner and outer pairs of wheels are to be turned differently in relation to each other in each steering case. The following angular relation will prevail in the case according to FIG. 1.

$$tg\alpha_1 = \frac{a}{c}; \quad tg\alpha_2 = \frac{a}{c+b};$$

i.e. $tg\alpha_2 = \frac{c \cdot tg\alpha_1}{c+b} =$ $$tg\alpha_2 = \frac{1}{\cot_1 + K}.$$

in which $K = b/a$
- $2a$ = wheel base of vehicle
- $b$ = wheel track of vehicle
- $c$ = distance from connecting line between the two inner wheels A and B and the turning center G.
- FIG. 2 shows in the form of a diagram the relation between the turning angle $\alpha_2$ of the outer pair of wheels and the turning angle $\alpha_1$ of the inner pair of wheels at $K = 2$, i. e. for a vehicle that has the wheels positioned at the corners of a square.

In accordance with the above, the form of the curve occuring to FIG. 2 will be changed if K is changed, i.e., if the relation between the wheel base of the vehicle and the wheel track is chosen differently.

In case the vehicle is equipped with a servo for each wheel, the input signal to, for instance, the servos of the outer wheels can easily be adapted so that the relation desired for the deflection between the outer wheels and the inner wheels is obtained. The steering signals to the servos can be achieved electrically or mechanically, in the latter case by means of curves, pneumatics, hydraulics, etc.

The extensible chassis frame will be illustrated in conjunction with an electric steering system which comprises devices in the form of a number of microswitches placed along the frame in its longitudinal direction for sensing the prevailing length of the frame. The microswitches are comprised in a damping network belonging to the steering system, which will thus be set according to the prevailing length of the frame so that it can influence the steering signals to the outer pairs of wheels in accordance with the steering curve applicable to the prevailing length of the frame.

Said damping network is shown in FIG. 3a, which in the following should appropriately to be studied together with FIG. 4, which is intended to illustrate the magnitudes of the steering signals in relation to the angular deflection ($\alpha$) of the steering wheel for different lengths of the frame. The damping network shown includes components for three breaking points on the curve in question. If more accurate reproduction of the curve is desired, the number of components should be increased accordingly.

In FIG. 3a a signal transmitter is designated 1, which signal transmitter is fed from a constant source of direct current and which comprises two steering wheel potentiometers 2 and 3, arranged parallel, the regulated values of which are dependent on the turning of a symbolically indicated steering wheel 4. The signal transmitter a is connected via two parallel branches 5 and 6, each comprising resistors $R_1$ and $R_2$, respectively, of equal sizes, connected to the electric servos 7–10 for the wheels A–D, one of the branches then connecting the signal transmitter with the electric servos for the wheels A and B, and the other branch connecting the signal transmitter with the electric servos for the wheels C and D. The diodes $D_1$ and $D_2$ are connected with opposite polarity in relation to each other in said two parallel branches. The point 11 at which said diodes are connected together is connected via a resistor $R_3$ to the center point 12 of a voltage divider $R_5^1$ and $R_6^1$, and, parallel with $R_3$, via a diode $D_3^1$ a further resistor $R_4^1$ is connected.

At the steering wheel deflection of O, which is shown in FIG. 3a no steering signals to the servos are obtained. Depending upon the direction in which the steering wheel is turned i.e., depending upon the polarity from the signal transmitter 1, the branch 5 or 6, at a slight turning of the steering wheel 4, will be connected via the diode $D_1$ or $D_2$ to the resistors $R_3$ and $R_6^1$. In this way a voltage division will arise, which involves that the input signal to the outer pair of wheels will be lower than the signal to the inner pair of wheels, so that the outer pair of wheels will be deflected less than the inner pair of wheels. If the deflection of the steering wheel 4 is increased further so that the voltage from the signal transmitter increases further, over a value where the voltage at point 11 is higher than the voltage at point 12, the resistor $R_4^1$ will be connected by the diode $D_3^1$ which has previously been preloaded by $R_5^1$ becoming conductive. The resistance for shunting the steering signal will thereby become still lower, which involves that the input signals to the outer pair of wheels will decrease further, thereby achieving the desired influence of the steering angle deflection.

As shown in FIG. 4 the resistor $R_3$ causes the input signal for the outer pair of wheels to be given a greater slope than the input signal for the outer pair of wheels counted from the steering wheel angle of O. The connection of the resistor $R_4^1$ by means of the diode $D_3^1$ causes a marked change in the curve to occur, so that a knee or a breaking point 1 is formed in same.

Through the introduction of a plurality of such part damping networks, which in FIG. 3 are designated the first, second and nth part damping networks, further changes of the slope and breaking points can be obtained in the specific curve for the prevailing length of the frame. In the part damping networks the diodes $D_3^1 - D_3^n$ are preloaded differently, i. e., the resistors $R_5^1 - R_5^n$ are of different sizes.

At a further increasing deflection of the steering wheel, an increasing voltage from the signal transmitter 1 is obtained in point 11, and the diodes $D_3^2 - D_3^n$ are successively made conductive. The diode $D_3^2$ then forms the breaking point 2 etc.

From the above, it will be realized that the slope of the curve in question at the respective point can be determined by the choice of the resistors $R_3$ and $R_4$, while the breaking points of the curves can be determined through the choice of the resistor $R_5$. With the aid of microswitches for sensing the prevailing length of the frame, the resistance determining the form of the curve can be changed.

In accordance with FIG. 3a, the positions of the breaking points are changed by means of the microswitches $K_1 - K_3$, each of which in the closed position connects the respective resistors $R_7 - R_9$, and the microswitches are then included in all part damping networks so that when a microswitch in question is actuated, a change of resistors takes place in all part damping networks. Thus, the microswitch $K_1$, when it makes contact, connects the resistor $R_7^1$ parallel with the resistor $R_5^1$ in the first part damping network, connects the resistor $R_7^2$ parallel with the resistor $R_5^2$ in the second part damping network etc. In the same way, the microswitches $K_2$ and $K_3$ connect the resistors $R_8^1 - R_8^n$ and $R_9^1 - R_9^n$ in the respective part damping networks.

If FIG. 4 is again regarded, the solid curve for the input signals to the outer pair of wheels indicates the case when no microswitch is actuated, i.e., the chassis frame has assumed its contracted position. If, upon extension of the chassis frame, for instance the microswitch $K_1$ is actuated, the position of the first breaking point will be displaced etc.

The slope of the curve in question after each breaking point is determined by means of the microswitches $K_4 - K_6$ which in the corresponding way connect the resistors $R_{10} - R_{12}$ parallel with the resistors $R_4$. The microswitch $K_4$ thus connects the resistors $R_{10}$ and $R_{10}^1$ in the first part damping network, the resistor $R_{10}^2$ in the second part damping network etc. The microswitches $K_5$ and $K_6$ make the corresponding connections of the resistors $R_{11}, R_{11}^1 - R_{11}^n$ and $R_{12}, R_{12}^1 - R_{12}^n$ in the respective part damping network. The slope after the starting point (steering wheel deflection 0) is thus determined by means of the resistors $R_{10} - R_{12}$, the slope after the first breaking point means of the resistors $R_{10}^1 - R_{12}^1$, the slope after the second breaking point by means of $R_{10}^2 - R_{12}^2$ etc.

If the above-discussed selectively connected fixed resistors are replaced by variable resistors according to FIG. 3b, which variable resistors are actuated by the wheel base of the vehicle, the input signal for the outer pair of wheels and, accordingly, the steering angles for same, can be changed continuously in relation to the steering signal for the inner pair of wheels, i.e. the vehicle can be made with a continuously variable damping network for the steering geometry. This, in turn, means that the vehicle can be made with a continuously variable steering system.

In the diagram according to FIG. 3a, the wheels in the respective pairs of wheels receive steering signals which, apart from their having the same amplitude, also have the same direction, although the wheels in the pair of wheels are deflected in opposite direction. It is then assumed that the steering function desired is obtained by the electric servo in question being made with an inverting member.

Figure 5A:
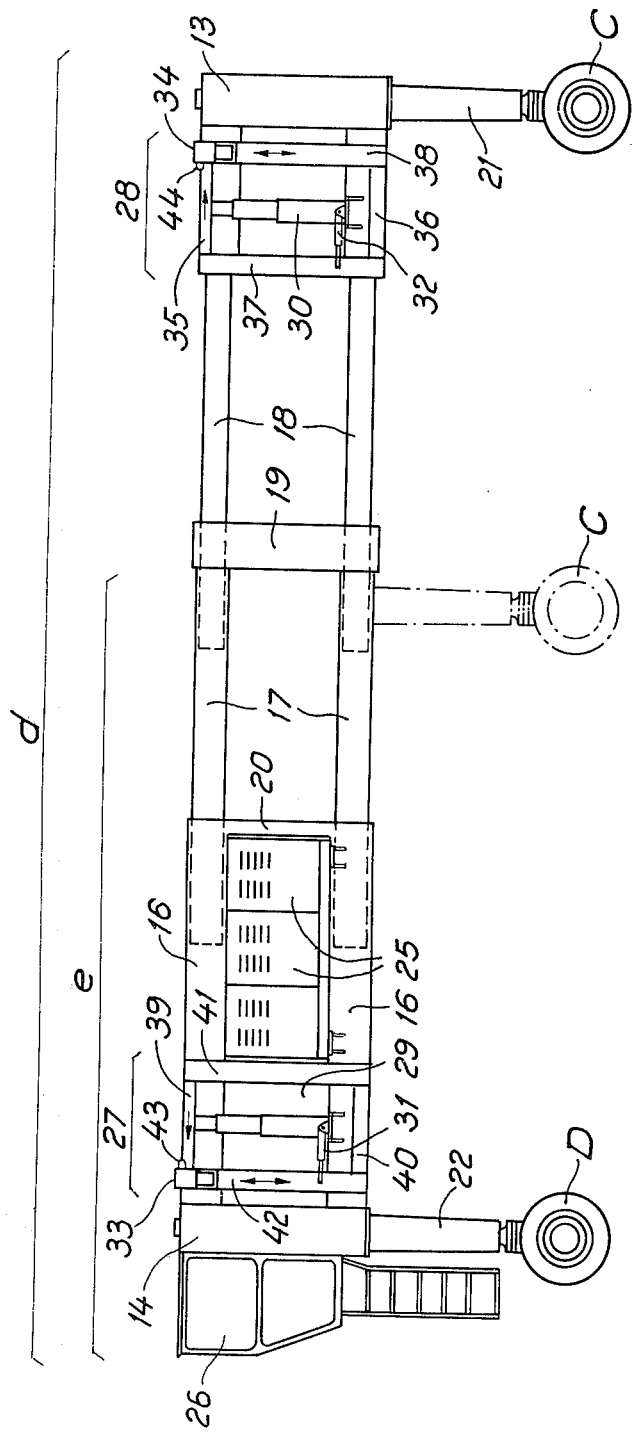

FIGS. 5a – 5d show the design according to which the truck is provided with a variable wheel base. FIG. 5a shows the truck in a vertical cross section in the longitudinal direction, the truck also being shown in its extended position when it has been given the wheel base d. In the contracted position the truck has the wheel base e, and as an example of the wheel base dimensions can be mentioned that the wheel base d can have a value of approx. 13.5 m and the wheel base e can have a value of approx. 7.4 m.

As shown in FIG. 5b, the truck is made in its horizontal cross section in the form of a right-angled yoke, a so called C truck, with the four wheels A–D being placed at the ends of the cross beams 13 and 14 of the yoke. The section 15 joining said cross beams comprises three frame parts in the form of frame members 16, 17 and 18, arranged telescopically in relation to each other, the members in the respective pairs of frame members being applied over each other, and held together by means of transverse parts 19 and 20.

Figure 5C:
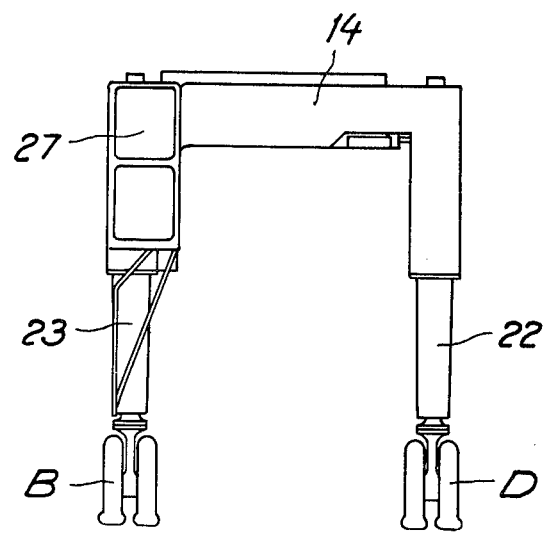
Figure 5D:
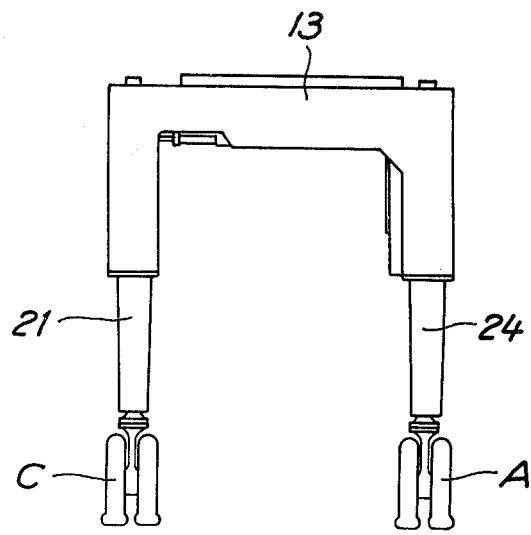

As will be noted from FIGS. 5c and 5d, the respective cross beams 13 and 14 have a cross section of the form of a rightangled U, so that portals are formed. The wheels A–D are arranged at the respective cross beams via telescopic legs 21–24, so that a further portal is formed at one longitudinal side of the truck, between the telescopic legs 21 and 22 and the lower members in the pair of frame members 16, 17 and 18. As an example of the wheel track of the truck can be mentioned approx. 3.6 m while the minimum portal height chosen at the cross beams 13 and 14 is 4.5 m and the minimum portal height chosen at said longitudinal side is approx. 3 m.

In the Figure, the power plants of the truck are designated 25, while the drivers compartment is designated 26. The drivers compartment is appropriately arranged so as to be rotatable, in a way which is known in itself, so that it can also be moved to the position 26 (see FIG. 5b) when the steering system of the truck is switched over for driving in the other main direction, which is at right-angles to the driving direction shown in e.g. FIG. 5b. It should then be noted that when driving in one direction, i.e. the direction according to FIG. 5b, the vehicle can be considered to have a variable wheel base, while when driving in the other direction, the wheel track of the vehicle will be variable.

In order to achieve a certain length, the wheels are set straight in one main driving direction, while the wheels B and D are locked with the ordinary brake system, not shown, of the vehicle and the wheels A and C are driven so that the length of frame desired is achieved.

At its cross beams 13 and 14 the truck also has lifting cranes 27 and 28, each of which comprises a lifting cylinder, 29 and 30 respectively, and a further cylinder, 31 and 32, respectively. The lifting frames also comprise lifting arms 33 and 34, respectively, which coact with the container in question, as described in the following. The lifting frames also comprise frame parts 35 – 38, and 39 – 42, respectively, which are arranged so that the lifting arms 33, 34 can be raised and lowered by means of the lifting cylinders 29, 30 and so that the entire lifting frame can be displaced in the longitudinal direction with said further cylinders 31, 32 and the displacement can then take place in the directions shown by the arrows. In order to make raising and lowering possible by means of the lifting cylinders 29, 30 the frame parts 37, 38 and 41, 42, respectively are telescopic. Furthermore, the entire frame 35 – 38 and 39 – 42, respectively, is arranged relative to the beams 16, 18 in a way which is known in itself so that the riding in the longitudinal direction of the beams can take place.

Said lifting arms 33 and 34 which thus are easy to operate by means of the cylinders 29 – 31 have protruding pins 43, 44 which can be made to coact with corner boxes in the containers in question, so that these can be lifted in the pins in this way. The truck is then driven over the container, after which the lifting arms are actuated so that the contact between the pins and the container is achieved. The upper part of the lifting frame with the pins supporting the lifting arms can also be displaced by means of cylinders 45 and 46 in the transversal direction of the truck so that the container can be set up against a wall. The lifting arms 33, 34 can also be made so that they are telescopic.

Figure 6A:
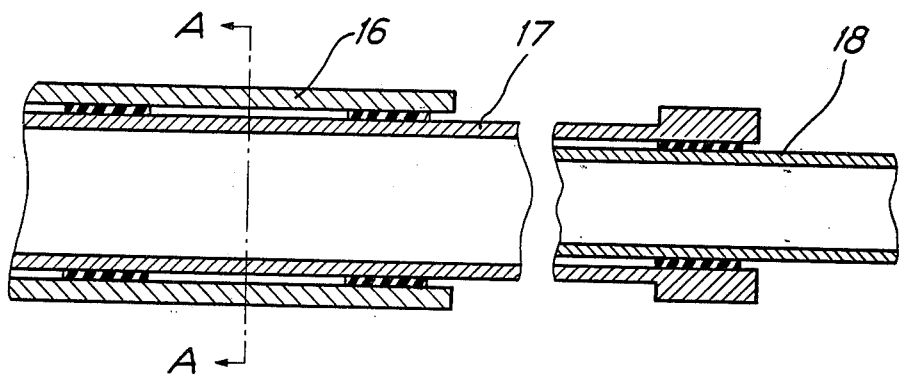
Figure 6B:
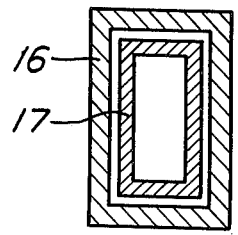

FIGS. 6a and 6b are intended to illustrate how the respective members in the abovementioned pairs of frame members 16, 17 and 18 are arranged telescopically in relation to each other.

Figure 7A:
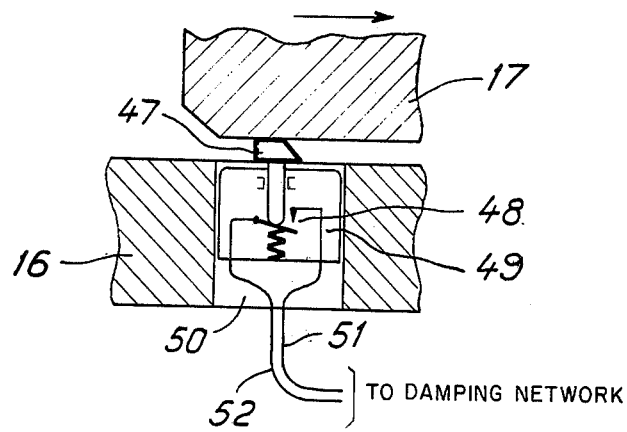
Figure 7B:
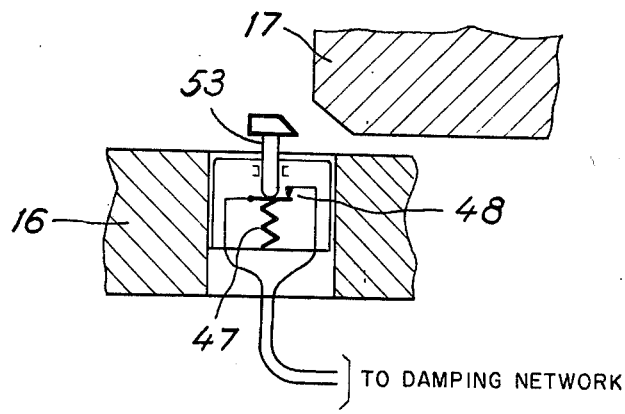

FIGS. 7a and 7b show the representative positioning in the members of the abovementioned microswitches $K_1 - K_6$. In the present case, the contact arm 47 of the switches has been actuated, as shown in 7a, when for instance the telescopically arranged members 16 and 17 assume a first extending position in relation to each other. The actuated contact arm keeps a closing contact 48 open. Said contact is enclosed in the casing 49 of the microswitch and the microswitch itself is arranged in a recess 50 in the member in question, which in the illustrated case is the member 16. The microswitch is connected to the damping network according to FIG. 3a via electrical conductors 51 and 52.

In FIG. 7b the members 16 and 17 have assumed a second degree of extension in relation to each other, and the contact arm 47 has been disengaged so that the contact 48 has been closed by means of a spring 53.

The microswitches are positioned along the longitudinal direction of the frame members, and when the frame members are entirely contracted, all of the microswitches are actuated, i.e., they are not making contact. At different degrees of extension, different numbers of microswitches are actuated.

Figure 8:
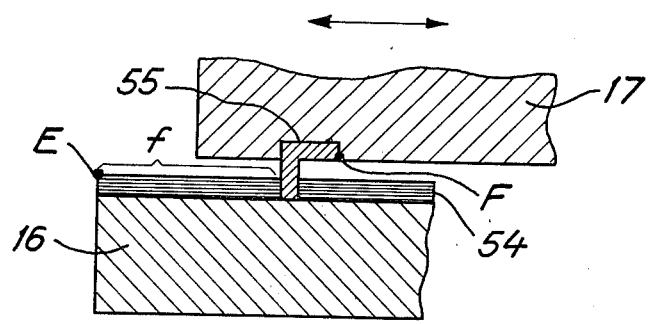

FIG. 8 shows an embodiment of the variable resistors indicated in FIG. 3b, and in this case the example again relates to the members in the pair of frame members 16 and 17. The member 17 is then provided with a resistor bar 54, while the member 17 supports a contact 55. The voltage connection then takes place at the points E and F and the prevailing resistance is determined by the distance of which, in turn, is determined by the degree of extension between the members. As indicated above, the truck according to the invention has telescopic legs, and a representative leg of this kind is shown in FIG. 9.

In this case, only one tire 56 has been shown. The telescopic leg comprises a steering shaft 57, which at its upper end supports a sprocket wheel 58 for a steering chain 59. The steering chain is actuated via steering cylinders 60 which, in turn, are connected with a pilot valve 61 which receives the steering signals for the wheel.

At its other end, the steering shaft 57 is provided with a longitudinally positioned transverse groove, by means of which the shaft is non-rotatably fastened in a lifting system 62, which is arranged so that it can be displaced on the shaft in its longitudinal direction, so that the lifting system can be moved in a cylinder 63 with the aid of a hydraulic pressure from a pump (not shown) via a hydraulic pipe 64. The lifting piston is nonmovably fastened via its rod 65 to a vertical axle 66 for the wheel. The shaft 57, the axle 66 and the piston rod 65 are sealed by means of sealing devices which are known in themselves.

The invention is not limited to the embodiment shown above as an example, but can be subject to modifications within the scope of the following claims.

We claim:

1. A truck for stowing, stacking etc., large containers of varying sizes, said truck having a chassis supported at four corners thereof by means of four elongated legs extending downwardly from said four corners to wheels carried by the lower ends of said legs respectively, said chassis comprising a pair of substantially parallel, transverse cross beams spaced from one another and interconnected to one another by a pair of elongated longitudinal beams, said longitudinal beams each comprising a plurality of telescopic beam parts which can be selectively displaced longitudinally relative to one another to vary the effective length of said longitudinal beams thereby to vary the effective length of said chassis, said chassis defining a pair of open end portals at the opposing ends of said chassis respectively, each of said end portals being formed by one of said cross beams and by two of said downwardly extending legs respectively, the width of each end portal corresponding to the distance between said two legs and the height of each end portal being greater than the distance between said legs, said pair of longitudinal beams being disposed in vertically superposed relation to one another with both longitudinal beams being located adjacent the same corresponding ends of said cross beams whereby a horizontal section of said chassis is shaped substantially in the form of a right-angled yoke having a substantially C-configuration, the lower of said pair of longitudinal beams being disposed at an elevated position and cooperating with said legs and with the chassis to form a side portal having a width corresponding substantially to the length of said chassis and a height substantially equal to the distance between the pair of legs at a given end of said chassis, and said truck including a steering system operative to set the wheels at the lower ends of said legs into position for steering said vehicle along either of two main directions, one of said main directions being in the direction of elongation of said longitudinal beams and the other of said main directions being at right angles to the direction of elongation of said longitudinal beams.

2. The truck of claim 1 wherein each of said legs is telescopically extensible.

3. The truck of claim 1 wherein said steering system comprises an electrical system which includes servos for controlling the steering of said wheels.

4. The truck of claim 3 including means responsive to variations in the effective length of said telescopic longitudinal beams for controlling the energization of said servos.

5. A truck for stowing, stacking, etc., large containers of varying sizes, said truck having a chassis supported at four corners thereof by means of wheels, said chassis comprising a pair of substantially parallel, transverse cross beams spaced from one another and interconnected to one another by a pair of longitudinal beams, said longitudinal beams each comprising a plurality of telescopic beam parts which can be selectively displaced longitudinally relative to one another to vary the effective length of said longitudinal beams thereby to vary the effective length of said chassis, said chassis defining end portals which are formed by said cross beams and said wheels, said pair of longitudinal beams being disposed in vertically superposed relation to one another with both longitudinal beams being located adjacent the same corresponding ends of said cross beams whereby a horizontal section of said chassis is shaped substantially in the form of a right-angled yoke having a substantially C-configuration, the lower of said pair of longitudinal beams being disposed at a height where it, together with the chassis parts at the end portals and the wheels, forms a side portal, and said truck including a steering system arranged to be switched over for adaptation to the steering geometry of the selected effective length of said chassis, the telescopic beam parts of said longitudinal beams including microswitches longitudinally spaced from one another along said telescopic beam parts and responsive to variations in the effective lengths of said longitudinal beams for controlling the switching of said steering system, said steering system comprising an electrical system having a plurality of resistors forming portions of a damping network, at least some of said resistors being connected into and disconnected from said network under the control of said microswitches, said microswitches being so arranged that, when said beam parts are telescopically compressed to form the shortest effective beam length, all of the microswitches are in their unactuated positions whereas, when said beam parts are telescopically displaced relative to one another to extend the effective length of said beam, the number of unactuated microswitches decreases in dependence upon the degree of extension of said longitudinal beams.

6. The truck of claim 5 wherein said vehicle includes a steering wheel, said steering system including a signal generator operative to generate electrical steering signals for controlling the steering of both an outer pair and an inner pair of said supporting wheels, said damping network operating to damp the electrical steering signals which are applied to the outer pair of said supporting wheels in dependence upon the deflection of said steering wheel.

7. A truck for stowing, stacking, etc., large containers of varying sizes, said truck having a chassis supported at four corners thereof by means of wheels, said chassis comprising a pair of substantially parallel, transverse cross beams spaced from one another and interconnected to one another by a pair of longitudinal beams, said longitudinal beams each comprising a plurality of telescopic beam parts which can be selectively displaced longitudinally relative to one another to vary the effective length of said longitudinal beams thereby to vary the effective length of said chassis, said chassis defining end portals which are formed by said cross beams and said wheels, said pair of longitudinal beams being disposed in vertically superposed relation to one another with both longitudinal beams being located adjacent the same corresponding ends of said cross beams whereby a horizontal section of said chassis is shaped substantially in the form of a right-angled yoke having a substantially C-configuration, the lower of said pair of longitudinal beams being disposed at a height where it, together with the chassis parts at the end portals and the wheels, forms a side portal, and said truck including a steering system arranged to be switched over for adaptation to the steering geometry of the selected effective length of said chassis, the telescopic beam parts of said longitudinal beams including sensor devices responsive to variations in the effective lengths of said longitudinal beams for controlling the switching of said steering system, said steering system comprising an electrical system having a plurality of resistors forming portions of a damping network, at least some of said resistors being connected into and disconnected from said network under the control of said sensor devices, said steeriing system including a signal generator operative to generate electrical steering signals for controlling the steering of both an outer pair and an inner pair of said supporting wheels, said vehicle including a steering wheel, and said damping network operating to damp the electrical steering signals which are applied to the outer pair of said supporting wheels in dependence upon the deflection of said steering wheel.

8. A truck for stowing, stacking, etc., large containers of varying sizes, said truck having a chassis supported at four corners thereof by means of wheels, said chassis comprising a pair of substantially parallel, transverse cross beams spaced from one another and interconnected to one another by a pair of longitudinal beams, said longitudinal beams each comprising a plurality of telescopic beam parts which can be selectively displaced longitudinally relative to one another to vary the effective length of said longitudinal beams thereby to vary the effective length of said chassis, said chassis defining end portals which are formed by said cross beams and said wheels, said pair of longitudinal beams being disposed in vertically superposed relation to one another with both longitudinal beams being located adjacent the same corresponding ends of said cross beams whereby a horizontal section of said chassis is shaped substantially in the form of a right-angled yoke having a substantially C-configuration, the lower of said pair of longitudinal beams being disposed at a height where it, together with the chassis parts at the end portals and the wheels, forms a side portal, and said truck including a steering wheel associated with a steering system, said steering system being arranged to be switched over for adaptation to the steering geometry of the selected effective length of said chassis, the telescopic beam parts of said longitudinal beams including sensor devices responsive to variations in the effective lengths of said longitudinal beams for controlling the switching of said steering system, said steering system comprising an electrical system having a plurality of variable resistors comprising portions of a damping network, said sensor devices being operative to vary the magnitudes of said resistors, said steering system further including a signal generator operative to generate electrical steering signals for controlling the steering of both an outer pair and an inner pair of said supporting wheels, said damping network operating to damp the electrical steering signals which are applied to the outer pair of said supporting wheels in dependence upon the deflection of said steering wheel.

* * * * *